(12) United States Patent
Waterman

(10) Patent No.: US 12,552,661 B2
(45) Date of Patent: Feb. 17, 2026

(54) NANOPORE ARRAY WITH ELECTRODE CONNECTORS PROTECTED FROM ELECTROSTATIC DISCHARGE

(71) Applicant: Oxford Nanopore Technologies PLC, Oxford (GB)

(72) Inventor: David Waterman, Oxford (GB)

(73) Assignee: Oxford Nanopore Technologies PLC, Oxford (GB)

( * ) Notice: Subject to any disclaimer, the term of this patent is extended or adjusted under 35 U.S.C. 154(b) by 854 days.

(21) Appl. No.: 17/057,994

(22) PCT Filed: May 8, 2019

(86) PCT No.: PCT/GB2019/051262
§ 371 (c)(1),
(2) Date: Nov. 23, 2020

(87) PCT Pub. No.: WO2019/224517
PCT Pub. Date: Nov. 28, 2019

(65) Prior Publication Data
US 2021/0300750 A1    Sep. 30, 2021

(30) Foreign Application Priority Data
May 24, 2018    (GB) ...................................... 1808566

(51) Int. Cl.
*B01L 3/00*    (2006.01)
*B81B 7/00*    (2006.01)
(Continued)

(52) U.S. Cl.
CPC .......... *B81B 7/0022* (2013.01); *B01L 3/5085* (2013.01); *C12Q 1/6869* (2013.01);
(Continued)

(58) Field of Classification Search
CPC .............................. B01L 3/5085; B81B 7/0022
See application file for complete search history.

(56) References Cited

U.S. PATENT DOCUMENTS 3,799,743 A    3/1974    Alexander et al.
4,154,795 A    5/1979    Thorne
(Continued)

FOREIGN PATENT DOCUMENTS

AU    2003240941 A1    12/2003
CN    1303147 A        7/2001
(Continued)

OTHER PUBLICATIONS

International Search Report and Written Opinion for Application No. PCT/GB2019/051262, mailed Aug. 22, 2019.
(Continued)

*Primary Examiner* — Natalia Levkovich
(74) *Attorney, Agent, or Firm* — Wolf, Greenfield & Sacks, P.C.

(57) ABSTRACT

A component (8) adapted to engage with a receiver (6) has an array of contact pads (16) to removeably connect with a corresponding array of connectors (18) on the receiver (6). Each contact pad (16) of the array is electrically connected to the electrode (26) of a corresponding recess or well (28) that is part of a sensor, wherein a membrane is formable across each recess. A conductive grid (102) is configured between the contact pads (16) of the array, to inhibit an electrostatic discharge (ESD) conducting across the recesses or wells and/or direct an ESD away from the recesses or wells.

14 Claims, 10 Drawing Sheets

(51) Int. Cl.
   *C12Q 1/6869* (2018.01)
   *G01N 33/487* (2006.01)
(52) U.S. Cl.
   CPC .. *G01N 33/48721* (2013.01); *B01L 2300/161* (2013.01); *B81B 2201/05* (2013.01); *B81B 2203/033* (2013.01); *B81B 2203/04* (2013.01); *B81B 2207/07* (2013.01)

(56) References Cited

U.S. PATENT DOCUMENTS

| | | |
|---|---|---|
| 4,874,500 A | 10/1989 | Madou et al. |
| 5,234,566 A | 8/1993 | Osman et al. |
| 5,290,240 A * | 3/1994 | Horres, Jr. ............ A61M 5/145 604/141 |
| 5,403,451 A | 4/1995 | Riviello et al. |
| 5,503,803 A | 4/1996 | Brown et al. |
| 6,056,922 A | 5/2000 | Ikematsu |
| 6,300,141 B1 | 10/2001 | Segal et al. |
| 6,479,288 B1 | 11/2002 | Laffafian et al. |
| 6,483,931 B2 | 11/2002 | Kalnitsky et al. |
| 6,503,452 B1 | 1/2003 | Boxer et al. |
| 6,699,697 B2 | 3/2004 | Klemic et al. |
| 6,863,833 B1 | 3/2005 | Bloom et al. |
| 6,913,697 B2 | 7/2005 | Lopez et al. |
| 6,916,488 B1 | 7/2005 | Meier et al. |
| 7,077,939 B1 | 7/2006 | Crooks et al. |
| 7,144,486 B1 | 12/2006 | Fritsch et al. |
| 7,169,272 B2 | 1/2007 | Fritsch et al. |
| 7,294,247 B1 | 11/2007 | Tian et al. |
| 7,745,116 B2 | 6/2010 | Williams |
| 7,939,270 B2 | 5/2011 | Holden et al. |
| 8,124,191 B2 | 2/2012 | Ervin et al. |
| 8,197,775 B2 | 6/2012 | Johnston et al. |
| 8,461,854 B2 | 6/2013 | Chen et al. |
| 9,057,102 B2 | 6/2015 | Turner et al. |
| 9,546,400 B2 | 1/2017 | Turner et al. |
| 9,556,480 B2 | 1/2017 | Turner et al. |
| 9,613,247 B2 | 4/2017 | Yang |
| 9,678,056 B2 | 6/2017 | Turner et al. |
| 9,734,382 B2 | 8/2017 | Wang et al. |
| 9,738,929 B2 | 8/2017 | Turner et al. |
| 9,927,398 B2 | 3/2018 | Reid et al. |
| 10,036,065 B2 | 7/2018 | Jones |
| 10,215,768 B2 | 2/2019 | Sanghera et al. |
| 10,338,056 B2 | 7/2019 | Hyde et al. |
| 10,416,117 B2 | 9/2019 | Reid et al. |
| 10,549,274 B2 | 2/2020 | Brown et al. |
| 10,814,298 B2 | 10/2020 | Hyde et al. |
| 11,084,015 B2 | 8/2021 | Hyde et al. |
| 11,097,269 B2 | 8/2021 | Goto et al. |
| 11,561,216 B2 | 1/2023 | Hyde et al. |
| 11,596,940 B2 | 3/2023 | Waterman |
| 11,789,006 B2 | 10/2023 | Xie et al. |
| 11,913,936 B2 | 2/2024 | Hyde et al. |
| 12,121,894 B2 | 10/2024 | Waterman |
| 2002/0074227 A1 | 6/2002 | Nisch et al. |
| 2002/0123048 A1 | 9/2002 | Gau |
| 2002/0144905 A1 | 10/2002 | Schmidt |
| 2003/0015422 A1 | 1/2003 | Fritsch et al. |
| 2003/0075445 A1 | 4/2003 | Woudenberg et al. |
| 2003/0098248 A1 | 5/2003 | Vogel et al. |
| 2003/0111340 A1 | 6/2003 | Cheng et al. |
| 2003/0148401 A1 | 8/2003 | Agrawal et al. |
| 2003/0224523 A1 | 12/2003 | Thornberg et al. |
| 2004/0022677 A1 * | 2/2004 | Wohlstadter ......... G01N 21/253 422/52 |
| 2004/0096358 A1 | 5/2004 | Blankstein et al. |
| 2004/0171169 A1 | 9/2004 | Kallury et al. |
| 2005/0014162 A1 | 1/2005 | Barth et al. |
| 2005/0133101 A1 | 6/2005 | Chung et al. |
| 2005/0230272 A1 | 10/2005 | Lee et al. |
| 2005/0279634 A1 | 12/2005 | Ozaki et al. |
| 2006/0079009 A1 | 4/2006 | Salmon et al. |
| 2006/0163063 A1 | 7/2006 | Picollet-Dahan et al. |
| 2006/0194331 A1 | 8/2006 | Pamula et al. |
| 2006/0257941 A1 | 11/2006 | McDevitt et al. |
| 2006/0257992 A1 | 11/2006 | McDevitt et al. |
| 2006/0292649 A1 | 12/2006 | Cahill et al. |
| 2007/0035308 A1 | 2/2007 | Ide |
| 2007/0161101 A1 | 7/2007 | Takeuchi |
| 2007/0275480 A1 | 11/2007 | Brander et al. |
| 2008/0254995 A1 | 10/2008 | Kim et al. |
| 2009/0072332 A1 | 3/2009 | Dekker et al. |
| 2009/0142504 A1 | 6/2009 | Ervin et al. |
| 2009/0167288 A1 | 7/2009 | Reid et al. |
| 2009/0185955 A1 | 7/2009 | Nellisen |
| 2010/0035349 A1 | 2/2010 | Bau et al. |
| 2010/0147450 A1 | 6/2010 | Takeuchi et al. |
| 2010/0190253 A1 | 7/2010 | Tazaki et al. |
| 2010/0196203 A1 | 8/2010 | Sanghera et al. |
| 2010/0264935 A1 | 10/2010 | Erdman et al. |
| 2010/0304980 A1 | 12/2010 | Takeuchi et al. |
| 2011/0043234 A1 | 2/2011 | Lee et al. |
| 2011/0120871 A1 | 5/2011 | Reid et al. |
| 2011/0121840 A1 | 5/2011 | Sanghera et al. |
| 2011/0133255 A1 | 6/2011 | Merz |
| 2011/0214991 A1 | 9/2011 | Kim et al. |
| 2011/0274737 A1 | 11/2011 | Palmaz |
| 2011/0287414 A1 | 11/2011 | Chen et al. |
| 2011/0318774 A1 | 12/2011 | Larsen |
| 2012/0010085 A1 | 1/2012 | Rava et al. |
| 2013/0048499 A1 | 2/2013 | Mayer et al. |
| 2013/0071932 A1 | 3/2013 | Itchoda et al. |
| 2013/0140192 A1 | 6/2013 | Behrends et al. |
| 2013/0196442 A1 | 8/2013 | Momose et al. |
| 2013/0207205 A1 | 8/2013 | Chen |
| 2013/0217106 A1 | 8/2013 | Jones |
| 2013/0270521 A1 | 10/2013 | Peng et al. |
| 2013/0309776 A1 | 11/2013 | Drndic et al. |
| 2014/0010735 A1 | 1/2014 | Tanaka et al. |
| 2014/0174927 A1 | 6/2014 | Bashir et al. |
| 2014/0190833 A1 | 7/2014 | Lieber et al. |
| 2014/0243214 A1 | 8/2014 | Haga et al. |
| 2014/0255921 A1 | 9/2014 | Moysey et al. |
| 2014/0296083 A1 | 10/2014 | Brown et al. |
| 2014/0318964 A1 | 10/2014 | Dunbar et al. |
| 2014/0329693 A1 | 11/2014 | Reid et al. |
| 2014/0335512 A1 | 11/2014 | Moysey et al. |
| 2014/0346059 A1 | 11/2014 | Akeson |
| 2014/0346515 A1 | 11/2014 | Yanagi et al. |
| 2014/0371568 A1 | 12/2014 | Selby et al. |
| 2015/0014160 A1 | 1/2015 | Hyde et al. |
| 2015/0027885 A1 | 1/2015 | Rajaraman et al. |
| 2015/0065354 A1 | 3/2015 | Moysey et al. |
| 2015/0191709 A1 | 7/2015 | Heron et al. |
| 2015/0198611 A1 | 7/2015 | Ostrowski et al. |
| 2015/0204763 A1 | 7/2015 | Stelzle et al. |
| 2015/0218629 A1 | 8/2015 | Heron et al. |
| 2015/0232923 A1 | 8/2015 | Drndic et al. |
| 2015/0259724 A1 | 9/2015 | Guan et al. |
| 2015/0265994 A1 | 9/2015 | Hyde et al. |
| 2015/0268256 A1 | 9/2015 | Sanghera et al. |
| 2015/0300986 A1 | 10/2015 | Reid et al. |
| 2016/0040230 A1 | 2/2016 | Akeson et al. |
| 2016/0178576 A1 | 6/2016 | Maney et al. |
| 2016/0231307 A1 | 8/2016 | Xie |
| 2016/0257942 A1 | 9/2016 | Bruce et al. |
| 2017/0189906 A1 | 7/2017 | Moll et al. |
| 2017/0326550 A1 | 11/2017 | Brown et al. |
| 2017/0363577 A1 | 12/2017 | Reid et al. |
| 2018/0321188 A1 | 11/2018 | Reid et al. |
| 2018/0372713 A1 | 12/2018 | Stamm et al. |
| 2019/0210021 A1 | 7/2019 | Waterman |
| 2019/0242913 A1 | 8/2019 | Sanghera et al. |
| 2019/0391128 A1 | 12/2019 | Hyde et al. |
| 2020/0292521 A1 | 9/2020 | Xie et al. |
| 2021/0086160 A1 | 3/2021 | Hyde et al. |
| 2021/0170403 A1 | 6/2021 | Waterman |
| 2022/0023819 A1 | 1/2022 | Hyde et al. |
| 2023/0228733 A1 | 7/2023 | Hyde et al. |
| 2023/0258592 A1 | 8/2023 | Bedau |

(56) References Cited

U.S. PATENT DOCUMENTS

| | | | |
|---|---|---|---|
| 2023/0311118 A1 | 10/2023 | Waterman | |
| 2023/0349882 A1 | 11/2023 | Xie et al. | |
| 2024/0069007 A1 | 2/2024 | Xie et al. | |

FOREIGN PATENT DOCUMENTS

| | | |
|---|---|---|
| CN | 1434461 A | 8/2003 |
| CN | 1590555 A | 6/2004 |
| CN | 101078704 A | 11/2007 |
| CN | 100448007 C | 12/2008 |
| CN | 101490277 A | 7/2009 |
| CN | 100571871 C | 12/2009 |
| CN | 102263104 A | 11/2011 |
| CN | 103370617 A | 10/2013 |
| CN | 203466320 U | 3/2014 |
| CN | 103995035 A | 8/2014 |
| CN | 205828393 U | 12/2016 |
| CN | 106457247 A | 2/2017 |
| EP | 0532215 A2 | 3/1993 |
| EP | 1110084 A1 | 6/2001 |
| EP | 1120469 A2 | 8/2001 |
| EP | 1419818 A1 | 5/2004 |
| EP | 1535667 A1 | 6/2005 |
| EP | 1669746 A1 | 6/2006 |
| EP | 1677102 A1 | 7/2006 |
| EP | 1688742 A1 | 8/2006 |
| EP | 1710578 A1 | 10/2006 |
| EP | 1712909 A1 | 10/2006 |
| EP | 1779921 A1 | 5/2007 |
| EP | 2219032 A1 | 8/2010 |
| GB | 2237390 A | 5/1991 |
| GB | 2446823 A | 8/2008 |
| JP | S5-274882 A | 6/1977 |
| JP | 4014773 A2 | 1/1992 |
| JP | 4127066 B2 | 4/1992 |
| JP | H04-215052 A | 8/1992 |
| JP | 7307172 A2 | 11/1995 |
| JP | 2004-158330 A2 | 6/2004 |
| JP | 2005-098718 A | 4/2005 |
| JP | 2005-164276 A | 6/2005 |
| JP | 2005-300460 A | 10/2005 |
| JP | 2005-539242 A | 12/2005 |
| JP | 2006-312141 A | 11/2006 |
| JP | 2008-194573 A | 8/2008 |
| JP | 2009-128206 A | 6/2009 |
| JP | 2010-186677 A2 | 8/2010 |
| JP | 2012-247231 A | 12/2012 |
| JP | 2013-148425 A | 8/2013 |
| JP | 2013-242247 A | 12/2013 |
| JP | 2014-190891 A | 10/2014 |
| JP | 2014-529296 A | 11/2014 |
| JP | 2015-064373 A | 4/2015 |
| JP | 2018-510329 A | 4/2018 |
| KR | 10-2017-0012367 | 2/2017 |
| WO | WO 1988/008534 A1 | 11/1988 |
| WO | WO 1994/025862 A1 | 11/1994 |
| WO | WO 1997/016545 A1 | 5/1997 |
| WO | WO 1998/058248 A1 | 12/1998 |
| WO | WO 1999/013101 A1 | 3/1999 |
| WO | WO 2000/013014 A1 | 3/2000 |
| WO | WO 2000/025121 A1 | 5/2000 |
| WO | WO 2000/028312 A1 | 5/2000 |
| WO | WO 2001/059447 A1 | 8/2001 |
| WO | WO 2002/024862 A2 | 3/2002 |
| WO | WO 2002/029402 A1 | 4/2002 |
| WO | WO 2002/035221 A1 | 5/2002 |
| WO | WO 2002/082046 A2 | 10/2002 |
| WO | WO 2003/052420 A2 | 6/2003 |
| WO | WO 2005/040783 A1 | 5/2005 |
| WO | WO 2005/124888 A1 | 12/2005 |
| WO | WO 2006/012571 A1 | 2/2006 |
| WO | WO 2006/076703 A2 | 7/2006 |
| WO | WO 2006/100484 A2 | 9/2006 |
| WO | WO 2006/104639 | 10/2006 |
| WO | WO 2006/113550 A2 | 10/2006 |
| WO | WO 2006/138160 A2 | 12/2006 |
| WO | WO 2007/028003 A2 | 3/2007 |
| WO | WO 2007/049576 A1 | 5/2007 |
| WO | WO 2007/116978 A1 | 10/2007 |
| WO | WO 2007/127327 A2 | 11/2007 |
| WO | WO 2007/132002 A1 | 11/2007 |
| WO | WO 2008/012552 A1 | 1/2008 |
| WO | WO 2008/054611 A2 | 5/2008 |
| WO | WO 2008/102120 A1 | 8/2008 |
| WO | WO 2008/102121 A1 | 8/2008 |
| WO | WO 2008/124107 A1 | 10/2008 |
| WO | WO 2008/137008 A2 | 11/2008 |
| WO | WO 2008/156041 A1 | 12/2008 |
| WO | WO 2009/024775 A1 | 2/2009 |
| WO | WO 2009/035647 A1 | 3/2009 |
| WO | WO 2009/077734 A2 | 6/2009 |
| WO | WO 2010/086603 A1 | 8/2010 |
| WO | WO 2010/122293 A1 | 10/2010 |
| WO | WO 2010/142954 A1 | 12/2010 |
| WO | WO 2011/046706 A1 | 4/2011 |
| WO | WO 2011/067559 A1 | 6/2011 |
| WO | WO 2011/118211 A1 | 9/2011 |
| WO | WO 2011/154114 A2 | 12/2011 |
| WO | WO 2012/033524 A2 | 3/2012 |
| WO | WO 2012/042226 A2 | 4/2012 |
| WO | WO 2012/107778 A2 | 8/2012 |
| WO | WO 2012/138357 A1 | 10/2012 |
| WO | WO 2013/012881 A2 | 1/2013 |
| WO | WO 2013/021815 A1 | 2/2013 |
| WO | WO 2013/041878 A1 | 3/2013 |
| WO | WO 2013/057495 A2 | 4/2013 |
| WO | WO 2013/121193 A2 | 8/2013 |
| WO | WO 2013/121224 A1 | 8/2013 |
| WO | WO 2013/123379 A2 | 8/2013 |
| WO | WO 2013/153359 A1 | 10/2013 |
| WO | WO 2014/013260 A1 | 1/2014 |
| WO | WO 2014/019603 A1 | 2/2014 |
| WO | WO 2014/064443 A2 | 5/2014 |
| WO | WO 2014/064444 A1 | 5/2014 |
| WO | WO 2014/132343 A1 | 9/2014 |
| WO | WO 2014/158665 A1 | 10/2014 |
| WO | WO 2015/183871 A1 | 12/2015 |
| WO | WO 2015/193076 A1 | 12/2015 |
| WO | WO 2016/034591 A2 | 3/2016 |
| WO | WO 2016/059427 A1 | 4/2016 |
| WO | WO 2016/127007 A2 | 8/2016 |
| WO | WO 2016/172724 A1 | 10/2016 |
| WO | WO 2016/187519 A1 | 11/2016 |
| WO | WO 2018/007819 A1 | 1/2018 |
| WO | WO 2019/063959 A1 | 4/2019 |
| WO | WO 2019/160925 A1 | 8/2019 |
| WO | WO 2020/183172 A1 | 9/2020 |

OTHER PUBLICATIONS

International Preliminary Report on Patentability for Application No. PCT/GB2019/051262, mailed Dec. 3, 2020.
[No Author Listed] Avanti Polar Lipids, Inc. Avanti Polar Lipids-Preparations of Liposomes. Www.avantilipids.com 5 pages. Jul. 1, 2014.
Aghdaei et al., Formation of artificial lipid bilayers using droplet dielectrophoresis. Lab Chip. Oct. 2008;8(10):1617-20. doi: 10.1039/b807374k. Epub Aug. 13, 2008.
Altschul et al., Basic local alignment search tool. J Mol Biol. Oct. 5, 1990;215(3):403-10.
Altschul, A protein alignment scoring system sensitive at all evolutionary distances. J Mol Evol. Mar. 1993;36(3):290-300.
Anrather et al., Supported membrane nanodevices. J Nanosci Nanotechnol. Jan.-Feb. 2004;4(1-2):1-22.
Astier et al., Toward single molecule DNA sequencing: direct identification of ribonucleoside and deoxyribonucleoside 5'-monophosphates by using an engineered protein nanopore equipped with a molecular adapter. J Am Chem Soc. Feb. 8, 2006;128(5):1705-10.
Baaken et al., Planar microelectrode-cavity array for high-resolution and parallel electrical recording of membrane ionic currents. Lab Chip. Jun. 2008;8(6):938-44. doi: 10.1039/b800431e. Epub Apr. 16, 2008.

(56) References Cited

OTHER PUBLICATIONS

Bezrukov et al., Counting polymers moving through a single ion channel. Nature. Jul. 28, 1994;370(6487):279-81.
Bouaidat et al., Surface-directed capillary system; theory, experiments and applications. Lab Chip. Aug. 2005;5(8):827-36. Epub Jul. 1, 2005.
Bruggemann et al., Microchip technology for automated and parallel patch-clamp recording. Small. Jul. 2006;2(7):840-6.
Bull et al., Polymer Films on Electrodes. J. Electrochem Soc. May 1982;129(5):1009-1015.
Case 1:17-cv-00275-LPS Document 18. Notice of subsequent events relating to Oxford's motion to dismiss (D.I. 9). Oct. 18, 2017.
Case 1:17-cv-00275-LPS Document 19. Oxford Nanopore Technologies, Inc.'s response to Pacific Biosciences of California, Inc.'s notice of subsequent events. Oct. 24, 2017.
Case 1:17-cv-00275-RGA Document 10. Oxford's opening brief in support of its motion to dismiss PacBio's complaint for patent infringement. May 8, 2017.
Case 1:17-cv-00275-RGA Document 14. PacBio's response to Oxford's motion to dismiss. Jun. 5, 2017.
Case 1:17-cv-00275-RGA Document 16. Oxford's reply brief in support of its motion to dismiss PacBio's complaint for patent infringement. Jun. 26, 2017.
Case 1:17-cv-01353-LPS Document 13. First Amended Complaint for Patent Infringement. Nov. 30, 2017.
Case 1:17-cv-01353-LPS Document 15. Plaintiff's response to Oxford Nanopore Techologies, Inc.'s Motion to Dismiss and Request for Scheduling Conference. Nov. 30, 2017.
Case 1:17-cv-01353-RGA Document 10. Oxford's opening brief in support of its motion to partially dismiss Pacbio's complaint for patent infringement. Nov. 16, 2017.
Cheng et al., Discrete membrane arrays. J Biotechnol. Sep. 2000;74(3):159-74.
Cheng et al., Single Ion Channel Sensitivity in Suspended Bilayers on Micromachined Supports. Langmuir. 2001;17(4):1240-1242.
Danelon et al., Cell membranes suspended across nanoaperture arrays. Langmuir. Jan. 3, 2006;22(1):22-5.
Devereux et al., A comprehensive set of sequence analysis programs for the VAX. Nucleic Acids Res. Jan. 11, 1984;12(1 Pt 1):387-95.
Estes et al., Electroformation of giant liposomes from spin-coated films of lipids. Colloids Surf B Biointerfaces. May 10, 2005;42(2):115-23.
Fraikin et al., A high-throughput label-free nanoparticle analyser. Nat Nanotechnol. 2011;6(5):308?313. doi: 10.1038/nnano.2011.24.
Funakoshi et al., Lipid bilayer formation by contacting monolayers in a microfluidic device for membrane protein analysis. Anal Chem. Dec. 15, 2006;78(24):8169-74.
Garstecki et al., Formation of droplets and bubbles in a microfluidic T-junction-scaling and mechanism of break-up. Lab Chip. Mar. 2006;6(3):437-46. Epub Jan. 25, 2006. Erratum in: Lab Chip. May 2006;6(5):693.
Gonzalez-Perez et al., Biomimetic triblock copolymer membrane arrays: a stable template for functional membrane proteins. Langmuir. 2009;25(18):10447?10450. doi:10.1021/la902417m.
Hasanzadeh et al., Room-temperature ionic liquid-based electrochemical nanobiosensors. Trends Anal Chem. Dec. 2012;41:58-74.
Heron et al., Simultaneous measurement of ionic current and fluorescence from single protein pores. J Am Chem Soc. Feb. 11, 2009;131(5):1652-3. doi: 10.1021/ja808128s.
Hirano et al., Lipid Bilayers at Gel/Gel Interface for Ion Channel Recordings. Surf. Sci. Nanotech. 2008;6:130-133.
Holden et al., Functional bionetworks from nanoliter water droplets. J Am Chem Soc. Jul. 11, 2007;129(27):8650-5. Epub Jun. 16, 2007.
Horn, Avoiding Evaporation. Ibidi. Application Note 12. Mar. 29, 2012, pp. 1-3.
Hovis et al., Patterning and Composition Arrays of Supported Lipid Bilayers by Microcontact Printing. Langmuir. 2001;17:3400-3405.
Hromada et al., Single molecule measurements within individual membrane-bound ion channels using a polymer-based bilayer lipid membrane chip. Lab Chip. Apr. 2008;8(4):602-8. doi:10.1039/b716388f. Epub Feb. 29, 2008.
Ide et al., A novel method for artificial lipid-bilayer formation. Biosens Bioelectron. Oct. 15, 2005;21(4):672-7. Epub Jan. 26, 2005.
Ikariyama et al., Polypyrrole electrode as a detector for electroinactive anions by flow injection analysis. Anal. Chem. 1986, 58, 8, 1803-1806.
Ivanov et al., DNA tunneling detector embedded in a nanopore. Nano Lett. 2011;11(1):279-285. doi:10.1021/nl103873a.
Jeon et al., Long-term storable and shippable lipid bilayer membrane platform. Lab Chip. Oct. 2008;8(10):1742-4. doi: 10.1039/b807932c. Epub Aug. 22, 2008.
Jung et al., Detecting protein-ligand binding on supported bilayers by local pH modulation. J Am Chem Soc. Jan. 28, 2009;131(3):1006-14. doi: 10.1021/ja804542p.
Kam et al., Spatially Selective Manipulation of Supported Lipid Bilayers by Laminar Flow :? Steps Toward Biomembrane Microfluidic. Langmuir. 2003;19(5):1624-1631.
Kasianowicz et al., Protonation dynamics of the alpha-toxin ion channel from spectral analysis of pH-dependent current fluctuations. Biophys J. Jul. 1995;69(1):94-105.
Khafizov, Single Molecule Force Spectroscopy Of Single Stranded Dna Binding Protein And Rep Helicase. University of Illinois at Urbana-Champaign Dissertation. 2012.
Kim et al., Liquid-slate field-effect transistors using electrowetting. Applied Physics Letters. 90:043507-1-043507-3.
Korolev et al., Major domain swiveling revealed by the crystal structures of complexes of E. coli Rep helicase bound to single-stranded DNA and ADP. Cell. Aug. 22, 1997;90(4):635-47.
Krantz Lab. Planar Lip Bilayer Electrophysiology Equipment. Department of Molecular & Cell Biology, University of California, Berkeley. Oct. 6, 2007. Last accessed at mcb.berkeley.edu/labs/krantz/equipment/blm.html on Nov. 26, 2014.
Kung et al., Printing via Photolithography on Micropartitioned Fluid Lipid Membranes. Adv. Materials. 2000;12(10):731-734.
Langecker et al., Synthetic lipid membrane channels formed by designed DNA nanostructures. Science. Nov. 16, 2012;338(6109):932-6. doi: 10.1126/science.1225624.
Le Pioufle et al., Lipid bilayer microarray for parallel recording of transmembrane ion currents. Anal Chem. Jan. 1, 2008;80(1):328-32. Epub Nov. 15, 2007.
Lee et al., Ion channel switch array: A biosensor for detecting multiple pathogens. Industrial Biotechnology. May 2005;1(1):26-31. doi:10.1089/ind.2005.1.26.
Lee et al., Nanoarrays of tethered lipid bilayer rafts on poly(vinyl alcohol) hydrogels. Lab Chip. Jan. 7, 2009;9(1):132-9. doi: 10.1039/b809732a. Epub Oct. 22, 2008.
Lee et al., Polyelectrolyte Micropatterning Using Agarose Plane Stamp and a Substrate Having Microscale Features on Its Surface. Bull. Korean Chem. Soc., vol. 26(10):1539-1542 (2005).
Lewis et al., The Mesomorphic Phase Behavior of Lipid Bilayers. Structure Biological Membranes. 3rd Ed. Ed: Yeagle. CRC Press 2011. 19-89.
Li et al., Microfluidic system for planar patch clamp electrode arrays. Nano Lett. Apr. 2006;6(4):815-9.
Lieberman et al., Processive replication of single DNA molecules in a nanopore catalyzed by phi29 DNA polymerase. J Am Chem Soc. Dec. 22, 2010;132(50):17961-72. doi: 10.1021/ja1087612. Epub Dec. 1, 2010.
Luan et al., Base-by-base ratcheting of single stranded DNA through a solid-state nanopore. Phys Rev Lett. Jun. 11, 2010;104(23):238103. Epub Jun. 10, 2010.
Mach et al., Miniaturized planar lipid bilayer: increased stability, low electric noise and fast fluid perfusion. Anal Bioanal Chem. Feb. 2008;390(3):841-6. Epub Oct. 31, 2007.
Majd et al., Hydrogel stamping of arrays of supported lipid bilayers with various lipid compositions for the screening of drug-membrane and protein-membrane interactions. Angew Chem Int Ed Engl. Oct. 21, 2005;44(41):6697-700.

(56) References Cited

OTHER PUBLICATIONS

Malmstadt et al., Automated formation of lipid-bilayer membranes in a microfluidic device. Nano Lett. Sep. 2006;6(9):1961-5.
Mangold et al., Reference electrodes based on conducting polymers. Fresenius J Anal Chem. Jun. 2000;367(4):340-2.
Mastrangeli et al., Challenges for Capillary Self-Assembly of Microsystems. IEEE Transactions. Jan. 2011;1(1):133-149.
Mastrangeli et al., Self-assembly from milli- to nanoscales: methods and applications. J Micro Microeng. 2009; 19:083001.
Maurer et al., Reconstitution of ion channels in agarose-supported silicon orifices. Biosens Bioelectron. May 15, 2007;22(11):2577-84. Epub Nov. 13, 2006.
Mcalduff et al., Freestanding lipid bilayers as substrates for electron cryomicroscopy of integral membrane proteins. J Microsc. Feb. 2002;205(Pt 2):113-7.
Montal et al., Formation of bimolecular membranes from lipid monolayers and a study of their electrical properties. Proc Natl Acad Sci U S A. Dec. 1972;69(12):3561-6.
Moran-Mirabal et al., Micrometer-sized supported lipid bilayer arrays for bacterial toxin binding studies through total internal reflection fluorescence microscopy. Biophys J. Jul. 2005;89(1):296-305. Epub Apr. 15, 2005.
Ogier et al., Suspended Planar Phospholipid Bilayers on Micromachined Supports, Langmuir, vol. 16:5696-5701 (2000).
Onoe et al., Three-Dimensional Micro-Self-Assembly Using Hydrophobic Interaction Controlled by Self-Assembled Monolayers. J Micro Systems. Aug. 2004;13(4):603-611.
Parthasarathy et al., Protein patterns at lipid bilayer junctions. Proc Natl Acad Sci U S A. Aug. 31, 2004;101(35):12798-803. Epub Aug. 20, 2004.
Peterman et al., Ion Channels and Lipid Bilayer Membranes Under High Potentials Using Microfabricated Apertures. Biomedical Microdevices, vol. 4(3):231-236 (2002).
Polk et al., Ag/AgCl microelectrodes with improved stability for microfluidics, Sensors and Actuators B., vol. 114:239-247 (2006).
Rauf et al., Studies on sildenafil citrate (Viagra) interaction with DNA using electrochemical DNA biosensor. Biosens Bioelectron. May 15, 2007;22(11):2471-7. Epub Nov. 7, 2006.
Romer et al., Impedance analysis and single-channel recordings on nano-black lipid membranes based on porous alumina. Biophys J. Feb. 2004;86(2):955-65.
Sackmann, Supported membranes: scientific and practical applications. Science. Jan. 5, 1996;271(5245):43-8.
Sandison et al., Air-exposure technique for the formation of artificial lipid bilayers in microsystems. Langmuir. Jul. 17, 2007;23(15):8277-84. Epub Jun. 22, 2007.
Sandison et al., Rapid fabrication of polymer microfluidic systems for the production of artificial lipid bilayers. J. Micromech. Microeng., vol. 15:S139-S144 (2005).
Sapra et al., Lipid-coated hydrogel shapes as components of electrical circuits and mechanical devices. Sci Rep. 2012;2:848. doi: 10.1038/srep00848. Epub Nov. 14, 2012.
Sarles et al., Bilayer formation between lipid-encased hydrogels contained in solid substrates. ACS Appl Mater Interfaces. Dec. 2010;2(12):3654-63. doi: 10.1021/am100826s. Epub Nov. 10, 2010.
Schindler et al., Branched bimolecular lipid membranes. Biophys J. Sep. 1976;16(9):1109-13.
Schmidt et al., A Chip-Based Biosensor for the Functional Analysis of Single Ion Channels. Angew Chem Int Ed Engl. Sep. 1, 2000;39(17):3137-3140.
Shim et al., Stochastic sensing on a modular chip containing a single-ion channel. Anal Chem. Mar. 15, 2007;79(6):2207-13. Epub Feb. 9, 2007.
Smith et al., Micropatterned fluid lipid bilayer arrays created using a continuous flow microspotter. Anal Chem. Nov. 1, 2008;80(21):7980-7. doi: 10.1021/ac800860u. Epub Oct. 8, 2008.

Soni et al., Synchronous optical and electrical detection of biomolecules traversing through solid-state nanopores. Rev Sci Instrum. Jan. 2010;81(1):014301. doi: 10.1063/1.3277116.
Stoddart et al., Single-nucleotide discrimination in immobilized DNA oligonucleotides with a biological nanopore. Proc Natl Acad Sci U S A. May 12, 2009;106(19):7702-7. doi: 10.1073/pnas. 0901054106. Epub Apr. 20, 2009.
Sun et al., Microfluidic static droplet arrays with tuneable gradients in material composition. Lab Chip. Dec. 7, 2011;11(23):3949-52. doi: 10.1039/c11c20709a. Epub Oct. 12, 2011.
Suzuki et al., Highly reproducible method of planar lipid bilayer reconstitution in polymethyl methacrylate microfluidic chip. Langmuir. Feb. 14, 2006;22(4):1937-42.
Suzuki et al., Planar lipid bilayer reconstitution with a micro-fluidic system. Lab Chip. Oct. 2004;4(5):502-5. Epub Sep. 2, 2004.
Suzuki et al., Planar Lipid Membrane Array for Membrane Protein Chip. 17th IEEE International Conference on Micro Electro Mechanical Systems (MEMS), pp. 272-275 (2004).
Syms et al., Surface Tension-Powered Self-Assembly of Microstructures—The State of the Art. J Micro Systems. Aug. 2003;12(4):387-417.
Third Party Submission Under 37 CFR 1.290 for U.S. Appl. No. 14/302,287 dated May 19, 2016.
Thorsen et al., Dynamic pattern formation in a vesicle-generating microfluidic device. Phys Rev Lett. Apr. 3, 20010;86(18):4163-6.
United States District Court for the District of Delaware Order. *Pacific Biosciences of California, Inc. v. Oxford Nanopore Technolgoies, Inc.* Civil Action No. 17-275-RGA. Nov. 9, 2017.
Urisu et al., Formation of high-resistance supported lipid bilayer on the surface of a silicon substrate with microelectrodes. Nanomedicine. Dec. 2005;1(4):317-22.
Vidinha et al., Ion jelly: a tailor-made conducting material for smart electrochemical devices. Chem Commun (Camb). Nov. 30, 2008;(44):5842-4. doi: 10.1039/b811647d. Epub Oct. 3, 2008.
Vulto et al., Microfluidic channel fabrication in dry film resist for production and prototyping of hybrid chips. Lab Chip. Feb. 2005;5(2):158-62. Epub Dec. 3, 2004.
Wagterveld et al., Ultralow hysteresis superhydrophobic surfaces by excimer laser modification of SU-8. Langmuir. Dec. 19, 2006;22(26):10904-8.
Watanabe et al., Electrical recording of Nanopore membrane proteins in a microfluidic device. The Papers of Technical Meeting on Bio Micro Systems, IEE Japa. 2010; BMS-10(7-27):5-8.
Yusko et al., Controlling protein translocation through nanopores with bio-inspired fluid walls. Nat Nanotechnol. Apr. 2011; 6(4): 253-260. Epub Feb. 20, 2011. doi: 10.1038/nnano.2011.12.
Zagnoni et al., Bilayer lipid membranes from falling droplets. Anal Bioanal Chem. Mar. 2009;393(6-7):1601-5. doi:10.1007/s00216-008-2588-5. Epub Jan. 19, 2009.
Zagnoni et al., Controlled delivery of proteins into bilayer lipid membranes on chip. Lab Chip. Sep. 2007;7(9):1176-83. Epub Jun. 27, 2007.
Zagnoni et al., Microfluidic array platform for simultaneous lipid bilayer membrane formation. Biosens Bioelectron. Jan. 1, 2009;24(5):1235-40. doi: 10.1016/j.bios.2008.07.022. Epub Jul. 23, 2008.
Piper et al., Stable silicon-ionic liquid interface for next-generation lithium-ion batteries. Nat Commun. Feb. 25, 2015;6:6230. 10 pages. doi: 10.1038/ncomms7230.
Third Party Observations for EP 17739663.7, mailed Sep. 23, 2021. 18 pages.
Third Party Observations for Application No. EP21749248.7, mailed Jul. 12, 2023.
Tomimatsu et al. Possible contamination of ionic liquids upon dissolution and absorption of rubber and resin components, Journal of Molecular Liquids. Mar. 15, 2019;278:78-85.

\* cited by examiner

NANOPORE ARRAY WITH ELECTRODE CONNECTORS PROTECTED FROM ELECTROSTATIC DISCHARGE

RELATED APPLICATIONS

This Application is a national stage filing under 35 U.S.C. 371 of international application number PCT/GB2019/051262, filed May 8, 2019, which claims the benefit of United Kingdom application number 1808566.2, filed May 24, 2018, each of which is incorporated by reference in its entirety.

The invention relates to a component that is configured to engage and mate with a second component or receiver. Together, the component and receiver form a device. In particular, the invention relates to a component having a sensor for sensing in wet conditions. The component and receiver form a microfluidic device.

Such sensors are known from WO99/13101 and WO88/08534, wherein the sensors are provided in a dry state and a liquid test sample can be applied to the device and transported to the sensor region within the device by capillary flow. The sensor can include a formation having an array of membranes comprising amphipathic molecules using an array of volumes of polar medium. The sensor can include a lipid bilayer. Other types of sensors are known, such as ion selective sensors comprising an ion selective membrane.

After initial manufacture the sensor is dry, and the component can receive a liquid to form an array of membranes, such as an array of volumes of polar medium which can be used in a range of applications, including the formation of membranes comprising amphipathic molecules.

Another example is provided by WO 2009/077734 which discloses an apparatus for creating layers of amphiphilic molecules. An analysis apparatus incorporating means to provide amphiphilic membranes and nanopores to the sensor is also disclosed by WO2012/042226.

Known sensors are incorporated within expensive test apparatus that provide high performance analysis of sensor readings across a broad range of tests or applications. These sophisticated devices have sensors that are sensitive and are protected through incorporation and encapsulation, while the data read from the sensors must be read quickly and efficiently.

Although the concept of segregating a function of an apparatus in to one or more sub-components is known, the sensitive nature of such sensors discourages a skilled person from separating functions because it can lead to a detriment in performance and/or reliability of the apparatus. Moreover, such sensitive and expensive apparatus is often reserved for laboratory use, or other controlled conditions and the use of specialist devices in uncontrolled environments, such as field use, further dissuades modification.

It is therefore an aim of the present invention to provide an improved component having a sensor, which is configured to inhibit damage to the sensor from, for example, electrostatic discharge (ESD). This component is modular such that it can be removably connected to a receiver to form a device. The device can then be removably connected with an apparatus to enable the data from the sensor to be read and analysed. Alternatively, the component can be removably connected directly to and from the apparatus. The invention generally resides in a such a modular component. Alternatively it can be supplied as a kit having a component and a receiver, or a component, receiver and device.

Generally, the invention resides in a component configured to removably engage with a receiver, the component having an array of electrodes for engaging with a corresponding array of connectors on a receiver. A plurality of electrodes of the array, which can be the majority of said electrodes on the array, are electrically connected to a corresponding recess, which can be a well. To inhibit any detriment to the performance of a sensor configured in the well the array of electrodes is guarded, with a structure, against uncontrolled or unregulated voltages, such as an electrostatic discharge (ESD). The structure, alone or in combination with the component as a whole, functions to electrically encapsulate the wells or recesses, at least in part, from uncontrolled voltages.

According to one aspect, the invention resides in a component configured to removably engage with a receiver, the component having: an array of electrodes and configured to removably connect with a corresponding array of connectors on a receiver, wherein a plurality of electrodes of the array are electrically connected to a corresponding recess or well, each recess forming part of a sensor for receiving a fluid therein such that a membrane is formable across each recess that separates each recess that separates the fluid in each recess from a conductive fluid in a common chamber.

The component has a conductive structure or grid, that appears like a matrix configured across the array to enable an electrical connection between the array of electrodes and an array of connectors of a receiver, wherein the conductive structure is configured to inhibit an electrostatic discharge (ESD) conducting across the recess and/or direct an ESD away from the recess. In other words, the connectors of the receiver, which extend from receiver to connect with the electrodes, extend through the grid. That is, each connector on the device reaches a pad on the component by passing between and past walls of the grid.

A common electrode can be in contact with the fluid in the common chamber. The conductive structure can be electrically connected to the common electrode. The membrane can be an amphipathic bilayer.

The component can be provided with a conductive fluid in the common chamber and fluid in the plurality of recesses. A membrane can be formed across the plurality of the recesses separating the fluid in the common chamber from the fluid in each of the plurality of recesses. The conductive structure can be configured to inhibit an electrostatic discharge passing across or via a sensor or a membrane via the recess and/or direct an electrostatic discharge away from a sensor or a membrane. When the membrane is formed across the plurality of recesses, the fluid contained in the recesses are separated from each other.

The conductive structure can be connected to the fluid in the common chamber to inhibit a potential difference occurring across the recess or membrane.

The component can be substantially planar, extending from a proximal to a distal end. The array of electrodes can be configured between ends of the component. Alternatively, the array of connectors can be located at one of the ends of the component.

A common electrode can be configured in the common sample chamber and the grid can be connected to the common electrode.

The array of electrodes can be mounted upon a substrate, such as the substrate used to for the wells. Alternatively, the electrodes and/or wells can be formed on a printed circuit board (PCB). A PCB can be cheaper and quicker to manufacture.

The sensor can have a nanopore incorporated therein. The nanopore can be biological. The fluid can be a liquid, which can form a lipid bilayer across a well. The sensor can have a nanopore connecting a cis and trans region within the component. The recess can support a membrane. The recess can be implemented in a solid-state membrane and have a nanopore in said recess. The nanopore can be a biological nanopore or a synthetic nanopore.

The component can have a membrane formed across a recess or all of the recesses. The membrane can be a lipid-bilayer. The grid can receive ESD events and dissipate the energy from an ESD to inhibit damage to the sensor and/or membrane.

The conductive structure has apertures or frames through which connectors of a receiver extend to contact the electrodes. The structure can be a web or net, mounted on at least a portion of the base that the electrodes are formed upon.

The conductive structure can inhibit contact with the electrode, particularly with part of the body such as a finger or gloved finger. However, contact of the electrode can occur and should a finger or gloved finger contact the electrode then the dimensions of the electrode are such that the conductive structure is also contacted. In other words, contact with the electrode alone is inhibited.

The component can also have a membrane formed across a plurality of the recesses. The conductive structure, or grid can be configured to inhibit an electrostatic discharge passing across the sensor or a membrane via the recess and/or direct an electrostatic discharge away from the sensor or a membrane.

The component can have a body that surrounds, encompasses or encloses the recess, and the conductive structure is connected to the body such that they have the same potential difference. In other words, the body and conductive structure can function as a ground plane for the component. In use, the conductive structure functions to protect the recess and, when a membrane is formed across the recess an ESD to the body of the conductive structure is inhibited from passing through the recess.

Each recess can have a fluid, such as a liquid, contained therein in contact with the membrane provided across each recess corresponding to respective electrodes of the array wherein the conductive structure or grid is connected to the fluid reservoir providing fluid to the recess to inhibit a potential difference occurring across the recess or membrane. The grid can be electrically connected to the body of the components to inhibit a potential difference or voltage across the sensor and/or membrane.

The component can be supplied with or without a fluid. If supplied without a fluid and the membranes pre-configured then the component can be said to be configurable to inhibit damage to the membrane and/or sensor.

The common sample chamber can contain an ionic fluid in contact with the common electrode. The fluid can provide a direct electrical connection between the array of connectors and the common electrode provided in the upper sample chamber containing fluid. An ESD can dissipate across the array as a whole thus minimising its effect. The effect of a charge applied to the grid upon sensor components, such as the membrane, in the recess or well can is inhibited or minimised because the grid and the fluid are connected via the common electrode, at least, and reside at the same potential thus inhibiting a voltage passing across the well.

The array of electrodes can be arranged on a base substrate and the conductive structure is mounted on the substrate. The array of electrodes mounted on a substrate can define a plane and the conductive structure can extend parallel to said plane. The conductive structure can extend parallel to said plane above the substrate and above the electrode such that a void is created therebetween. The grid can alternatively lie in the same plane as the substrate. Forming the grid from the substrate can reduce cost because the grid, or more specifically the walls of the grid, can be formed at minimal material cost or minimal process time. If the substrate is non-conductive a conductive layer can be added to at least a portion of the exposed surface of the grid.

The conductive structure can extend from a plane defined by the electrodes. The array of electrodes can be arranged on a base of substrate. At least part of the substrate can extend from the region between the electrodes to form a wall and the conductive structure can be configured on top of the wall. The conductive structure can be formed from the deposition of a conductive material in the region between electrodes.

The conductive structure can be configured to partially enclose each electrode. This can be achieved by the conductive electrode being formed on each side of the electrode while enabling the connector from the receiver to contact the electrode. The shape of the conductive structure, in cross-section, in a region distal from the electrode, can have a pointed edge or tip. Any charge from an ESD can, therefore, be concentrated at the point of the edge.

The conductive structure can be configured as a grid and extend in a planar direction, defined by the base or substrate, between the electrodes.

The electrodes can be arranged in an array having a rectilinear pattern. The footprint of each electrode can be quadrilateral. The footprint can, alternatively, be one of a circular, diamond-shaped or shape with 5 or more sides.

The cross-sectional profile of a wall of the grid can be rectangular. The top of the wall can have a non-flat profile, such as a rounded form.

The walls, in cross-section can taper outward to minimise the aperture in the grid or web or net such that contact with an electrode is further inhibited. In this way the surface area of the grid can be increased to provide a greater contact area for an object such as a finger.

The pitch of the electrodes of the array can be between 100 μm and 1500 μm. The pitch can be between 500 μm and 1000 μm, and preferably between 700 μm and 900 μm.

The thickness of the walls of the conductive structure, in cross-section, can be between a minimum of 10 μm and minimum of 200 μm. The wall thickness can be between 25 μm and 100 μm.

The windows or apertures of the conductive structure through which the connectors extend can have rounded corners. Rounded corners can provide a reduced inductance path between the grid and the common electrode.

The electrode array and conductive structure can be covered, at least in part, with a removable protective film or protective layer to inhibit antistatic discharge. The film can be configured to minimise any triboelectric charge that may be generated by the removal of the film, which is required before the component can be mated with the receiver. The film can inhibit a charge from conducting through, or in the region of, the recess and/or sensor by the conductive structure. The film and the conductive structure, therefore, can function synergistically.

In another aspect, the invention resides in a kit having a component as claimed and a receiver, wherein the array of connectors on the receiver are configured to extend through the conductive structure without contacting the conductive structure to form an electrical connection with the electrode on the component.

The grid can be connected to the conductive fluid in the sample chamber to inhibit a potential difference occurring across the recess or membrane formed between the fluid in the sample chamber and fluid in a recess, such that when a conductive fluid occupies the sample chamber an ESD is inhibited from conducting through, or in the region of, the recess and/or sensor by the conductive structure.

The recess or well of the component can be provided with a pore for reading the properties of nucleotides passing through the pore. The pore can be a nanopore in the membrane between the fluid in the sample chamber and the fluid in at least one well.

The conductive structure can be formed as a grid having a plurality of apertures. The grid can have an aperture aligned with each mating connector and electrode.

The invention is discussed below, by way of example only, with reference to the following figures in which.

Figure 1:
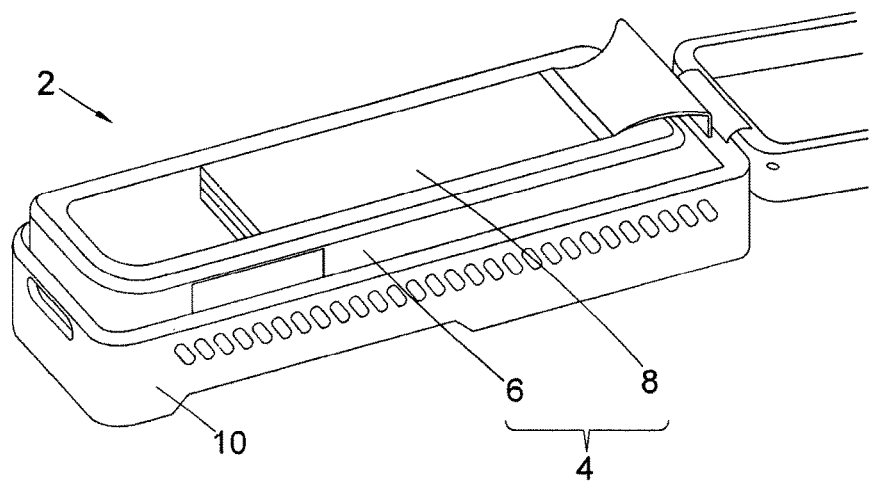
FIG. 1 is a perspective view of an apparatus having a removably detachable component.

FIG. 1 shows an apparatus 2 having a removably detachable device 4 having a receiver 6 and a component 8. The device is removably detachable from a base 10 of the apparatus 2. The various parts of the apparatus can be provided as a kit. The component 8 can be disposable. The device 4 can be inserted and removed from the base 10. The component 8 can be inserted and removed from the receiver 6.

Figure 2:
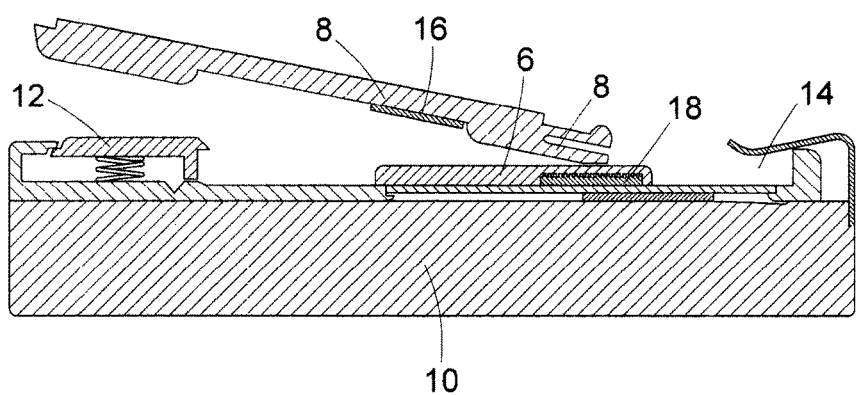
FIG. 2 is a cross-sectional schematic view of the apparatus of FIG. 1, showing the component detached from the apparatus but ready for connection thereto.

In FIG. 2 the component 8 is shown positioned above the receiver 6 prior to insertion. When inserted, the component and receiver are mechanically connected and secured by a latch 12 and a recess 14, which are located at the ends of the receiver. Electrically, the component and receiver can connect via an array of electrodes 16 on the component 8 and a corresponding array of connectors 18 of the receiver 6. The body of the component 8 is typically made of a plastic material having a degree of elasticity. The plastic material may for example be polycarbonate.

The component 8 can be disposable and, by way of example, has a disposable flow-cell located therein. The flow cell can be equivalent to that discussed in WO 2014/064443, which is hereby incorporated in its entirety by reference, wherein the component is configured to be a removable low-cost component, which can be disposed of after a single use. This is achieved by configuring more expensive components of the device 4 within the receiver 6. The low-cost component makes it feasible to perform multiple experiments with different flow-cells relatively cheaply. The base component 10 can house the electronics and cooling configuration for the overall apparatus 2. The receiver 6 can house further electronics not included in the base 10 and functions as an adaptor to receive the component 8.

Figure 3:
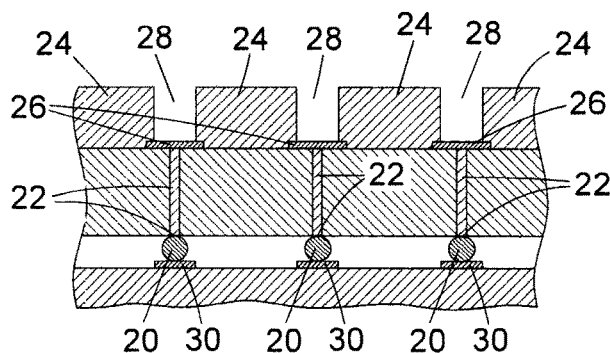
FIG. 3 is a cross-sectional view of wells of having a known connection structure.

Electrical connections are known from WO2009/077734, which is hereby incorporated in its entirety by reference and provides an example of the usage of the 'solder bump' approach that provides an electrical connection to a layer of amphiphilic molecules. FIG. 3 shows such a 'solder bump' 20 connection, as disclosed in WO2009/077734, connecting to a via 22 that passes through a substrate 24 to reach a well electrode 26 located at the bottom of a well or recess 28. The solder bump 20 enables a permanent connection with a seat 30 that is connected to a microprocessor or similar controller (not shown).

The well 28 is formed in the substrate 24 of non-conductive material and can be used to form or support a layer of amphiphilic molecules. In use, an aqueous solution can be introduced to the well 28, and region therearound, such that a layer of amphiphilic molecules is formed across the well 28 separating the aqueous solution in the well 28 from the remaining volume of aqueous solution above the recess. The arrangement of the well or recess 28, the well electrode 26 and additional circuitry (not shown) enables measurement of electrical signals across a layer of amphiphilic molecules. The well electrode can make electrical contact with the aqueous solution in the recess 28.

Figure 4:
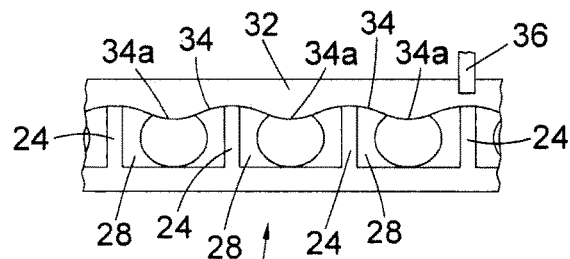
FIG. 4 is a cross-sectional view of wells of an apparatus provided with a layer of polar medium.
Figure 5:
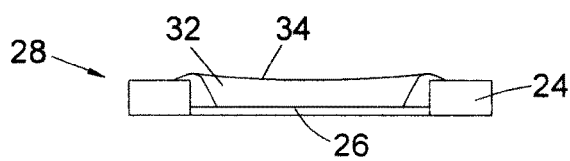
FIG. 5 is a cross-sectional view of another well of an apparatus showing ideal fluid behaviour.

FIGS. 4 and 5 are examples of a recess or well 28 forming part of a sensor array, as respectively disclosed in WO 2014/064443 and WO2013/121193, which are hereby incorporated in their entirety by reference and describes a well 28 is formed in a material 24 such as SU-8 forming a body, and many wells 28 may be formed in close proximity within the material to form an array of sensor wells. These wells 28 allow measurement of electrical signals across the layer 11 of amphiphilic molecules by connection of an electrical circuit 26 to the contacts 22 and 25. FIG. 4, known from WO2014/064443, shows a layer 32 of polar medium forming a meniscus interface 34a on a membrane 34 that protrudes into the wells 28 to contact a polar medium. A common electrode 36 arranged above the material 24 to make electrical contact with the layer 32 of polar medium once it has been provided. The ratio of the volume of fluid in a well 28 to the volume of the fluid in the layer above that forms the polar medium 32 can be between about 1:100 about 1:10000. FIG. 5, known from WO2013/121193, shows a schematic cross section through another microcavity or sensor well 28 of a sensor array. In practice, an array of such sensor wells 28 formed in a body will be provided in a component of an apparatus and further comprise a cover over the surface of the body, to define a cavity between the cover and the body. An electrode (not shown in FIG. 5) is arranged in the cavity for connection to the electrical circuit, and acts a common electrode for the wells in the array.

The recess or well 28 forms part of a sensor, and the sensing components must communicate with a reader or microprocessor. In the present invention these wells reside in the component 8 and must electrically communicate with a reader on the receiver 6 and/or base 10.

Removable connections, or non-permanent electrical connections are known, by way of example, from WO2016/059417, which is hereby incorporated in its entirety by reference and is suitable for an array of electrical connections in such a way that the component parts can be attached and detached, and optionally reattached thereafter, without requiring extreme conditions (whether chemical or environmental) to trigger the connection or disconnection.

While removably detachable electrical connections are known the inventor has realised that conventional connections for parts such as the component 8 and receiver 6 can be improved. In particular the interface can be improved to provide an additional layer of protection to the well or recess 28 and any sensor or sensing component residing or formed in such a recess 28. The interface that is connected to the wells on the component is sensitive to mechanical and/or electrical shock.

Figure 6:
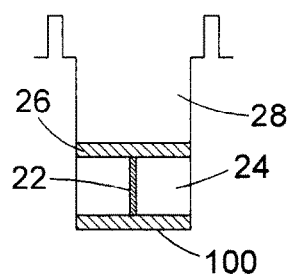
FIG. 6 is a cross-sectional view of a well of a component having a via connected to an exposed pad located on an array of electrodes of a component.

FIG. 6 shows, by way of example, one well 28 of a sensor array having an array of electrodes 16. Each well 28 is connected through one of the electrical connectors in the array 16. A pad 100 is provided to enable connection, via a via 22, to a well electrode 26. The pad 100 can be made from any conductive material, such as for example gold, copper or platinum. The substrate 24 functions as an insulator and is around 500 μm thick. The insulator can be made of silicon or glass, for example. The substrate in alternative examples of the invention can be conductive and provided with additional layers of insulating material or dielectric in order to configure pads, vias and other such components.

Figure 7:
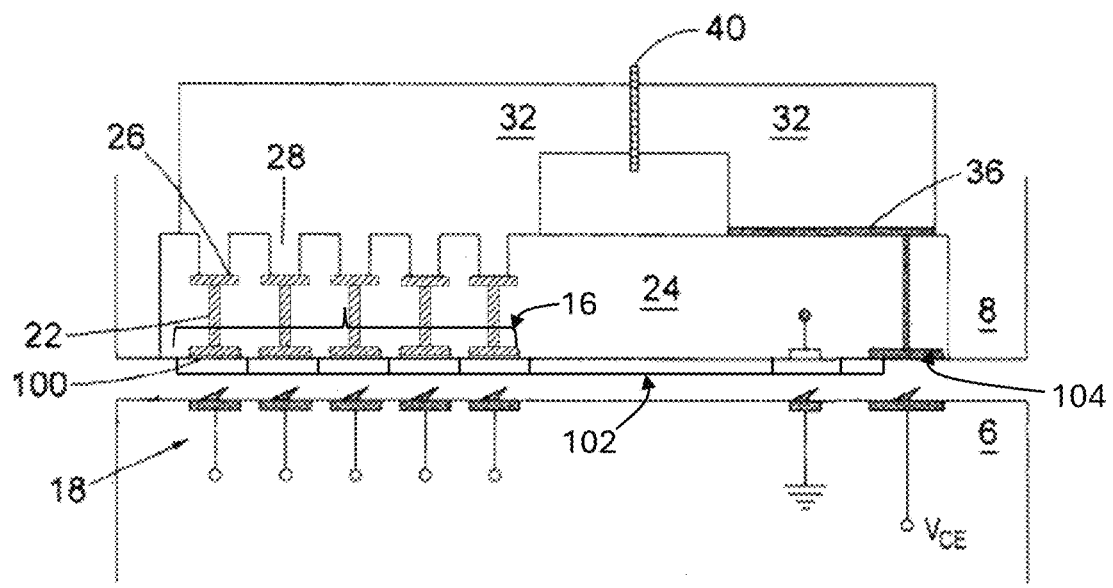
FIG. 7 is a cross-sectional view of a schematic showing five wells of a component, each connected to a pad and aligned with a respective connector of a receiver.
Figure 8:
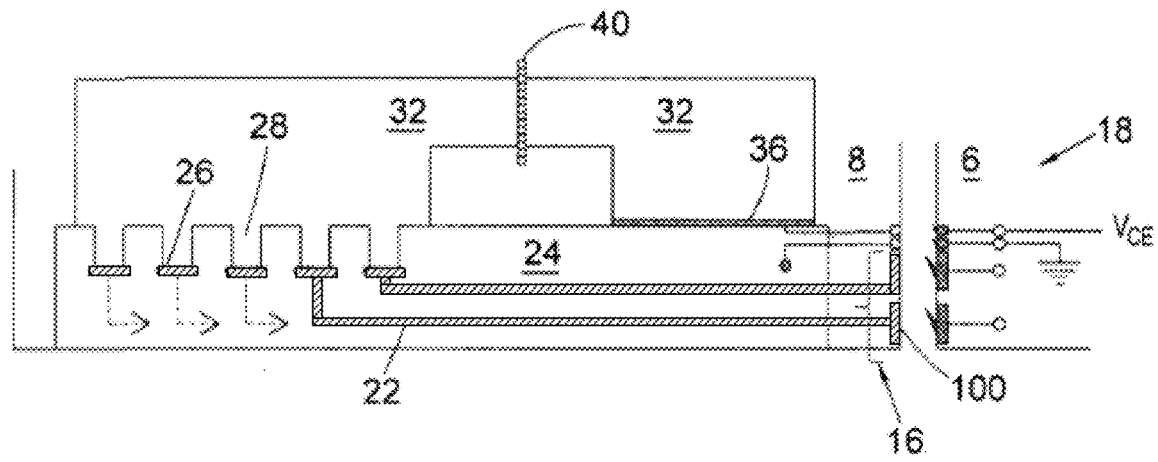
FIG. 8 is a cross-sectional view of a schematic showing five wells of a component, two of which are connected to pads of an array of an electrode at the end of the component.

FIG. 7 and FIG. 8 show the receiver 6 adjacent the component 8 with a portion (five wells 28) of the electrode array 16 aligned with an array of connectors 18. When connected, and the component is configured for use, signals detected by the well electrode 26 in the well 28 can be read. Signals pass from the well 28 via the well electrode 26 through the via 22 to the respective pad 100 of the electrode array 16, which is configured to contact a connector on the array of connectors and provide a signal to a processor, typically an ASIC device. A common electrode 36 is electrically connectable through the polar medium 32 via a conductive diffusion layer 40 to each well 28 in order that a processor can control, though multiplexing, which of the well sensors is read or sensed.

FIG. 7 represents the configuration shown in FIG. 2, while FIG. 8 represents a configuration wherein an array is configured at the end of the component 8 for engagement with an array of connectors located, for example, in the recess 14 of the receiver 6. Grid 102 is positioned across the array of electrodes shown in FIG. 7.

The invention is particularly suited to the protection of membranes formed over wells or recesses that are susceptible to damage or rupture by uncontrolled voltages, such as ESD, flowing through the well or sensor. The membrane may be a layer formed from amphiphilic molecules such as phospholipids, which have both hydrophilic and lipophilic properties. The amphiphilic layer may be a monolayer or a bilayer. The amphiphilic layer may be a co-block polymer such as disclosed in Gonzalez-Perez et al., Langmuir, 2009, 25, 10447-10450 or WO2014/064444, hereby incorporated by reference in its entirety.

The membrane may comprise an aperture formed in a solid state layer, which may be referred to as a solid state pore. The aperture may be a well, gap, channel, trench or slit provided in the solid state layer along or into which analyte may pass. Such a solid-state layer is not of biological origin. Solid state layers can be formed from both organic and inorganic materials including, but not limited to, insulating materials such as $Si_3N_4$, $Al_2O_3$, and SiO, organic and inorganic polymers such as polyamide, plastics such as Teflon® or elastomers such as two-component addition-cure silicone rubber, and glasses. The solid state layer may be formed from graphene. Suitable graphene layers are disclosed in WO-2009/035647, WO-2011/046706 or WO-2012/138357. Suitable methods to prepare an array of solid state pores is disclosed in WO-2016/187519.

A biological nanopore may be provided in one or more of the membranes providing a conduction pathway across each membrane which serves to fluidically connect fluid provided in a well of the well array with solution provided in an upper chamber. The nanopore may be a transmembrane protein pore derived from but not limited to alpha-hemolysin, anthrax toxin and leukocidins, outer membrane proteins/porins of bacteria, such as *Mycobacterium smegmatis* porin & lysenin. The pore may be derived from CsgG, such as disclosed in WO-2016/034591. The nanopore may be provided in the aperture of a solid state membrane. Such pores are known as hybrid pores. The nanopore may be formed from DNA origami.

The device of the invention is particularly suited for estimating the sequence of a polymer analyte. The analyte may be for example a polynucleotide, a polypeptide or a polysaccharide. Measurement of the polymer may take place during translocation of the polymer through the nanopore under a potential difference applied across the nanopore. The measurement may be a measurement of ion flow through the nanopore during translocation.

Ionic solution may be provided in the wells in contact with each respective membrane and the electrode provided in each of the respective wells of the array.

The component 8 can be supplied with a polar medium forming a meniscus or membrane over the well 28, having a nanopore located in the membrane of each well 28. The meniscus cooperates with the well to form part of the sensor. Alternatively, the component can be supplied 'dry' and without a polar medium, which is added to the component before installation to the device 6 and prior to testing or analysis of a sample. Further still, the component can be configured with a solid-state membrane and/or solid-state.

The meniscus and/or sensors of the well are sensitive to uncontrolled voltages, such as ESD. The wells, therefore, must be protected by inhibiting a voltage discharge passing across or through the well. In use, the pads 100 of the array of electrodes 16 are exposed in preparation for engagement with the array of connectors 18 on the device. Although the component 8 can be connected to a device 6 without the pads being touched, they remain susceptible to accidental touch by, for example, a finger tip. In the field, which is the antithesis of controlled laboratory conditions, a user would typically remove a component from its packaging and manually place it in the receiver. The invention mitigates any detrimental effects of a user contacting the array of electrodes 16 with, for example, their finger tip.

Figure 9:
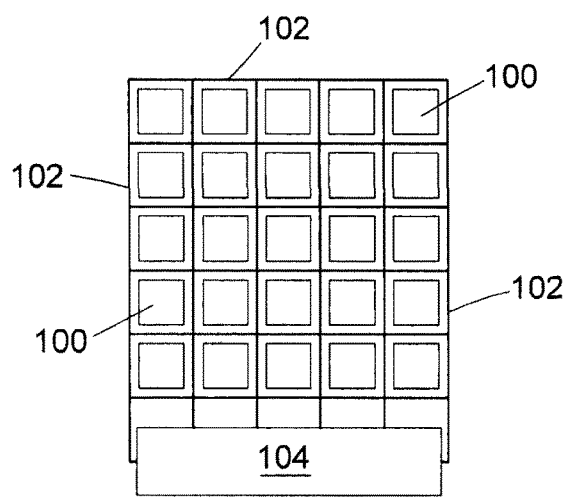
FIG. 9 is a schematic view of an array of pads of electrodes having a grid interposed and surrounding the pads, wherein the grid is connected to a grounding electrode.

FIG. 9 shows, for illustration purposes, an array of pads 100 of an array of electrodes 16. A conductive structure 102, or grid, is configured across the array of electrodes 16. The conductive structure, or grid, includes a common pad 104 that is connected to the common electrode 36. The grid 102 can form a mesh, or web, that is connected to the common electrode. The grid 102 is connected to the common electrode 36 by way of example for electrically connecting the grid to the polar medium 32 in the chamber above the wells.

Figure 10:
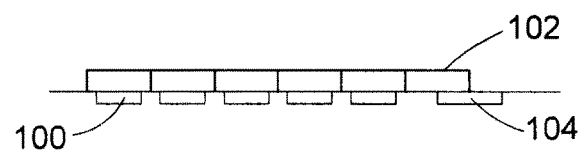
FIG. 10 is a schematic end-elevation view of the grid in FIG. 9.
Figure 11A:
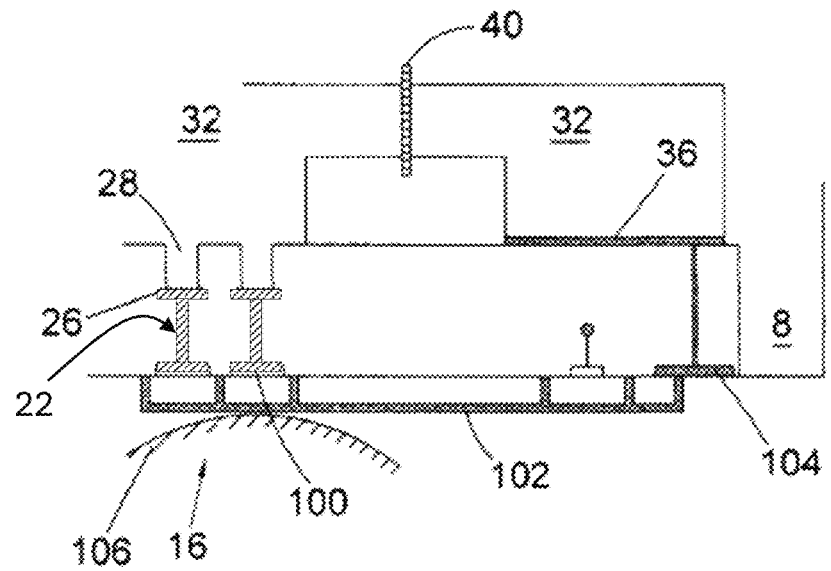
FIGS. 11a and 11b are schematic views of a portion of the grid positioned adjacent the pads of the electrode of the component and in the region of the wells.

Additionally or alternatively the grid can be connected to the polar medium 32, or the chamber in which the polar medium resides—this connection can be by means of at least one of: a dedicated via; a wired or bonded connection to a portion of a substrate; an electrical connection through the body of the component 8; or an electrical connection to the structure forming the chamber holding the polar medium 32, which surrounds the wells 28 of the array 16. FIG. 10 shows a cross-sectional view of a section of the grid 102 positioned above the array 16, while FIG. 11a shows the relationship between the grid 102 and the polar medium 32 or sample 32. In the example shown, the grid extends from areas on the substrate between the pads, but does not contact the pads 100, and extends above the surface of the substrate. In the example shown the grid forms a net across the surface. The grid, however, can be formed from walls surrounding one or more pads 100. The grid 102 is positioned across the array of electrodes shown in FIG. 7, in which the array of electrodes 16 can be arranged on a surface between the ends of the component 8 and can be positioned across the array of electrodes 16 shown in FIG. 8, wherein the array 16 is arranged at an end region or face of the component.

Figure 11B:
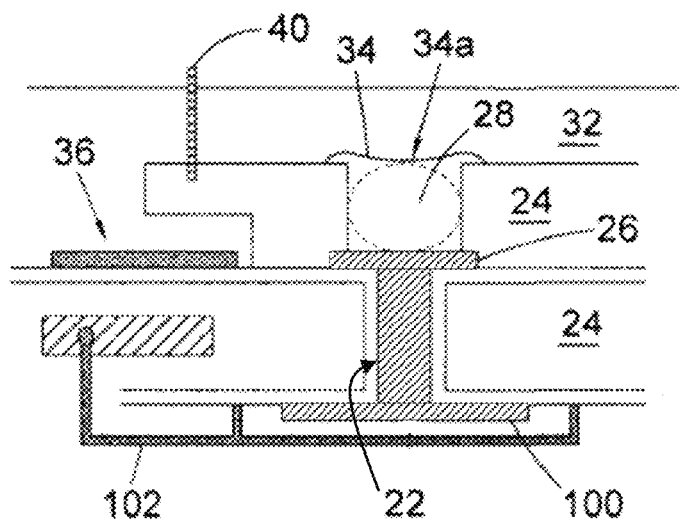

FIG. 11b shows an alternative example in which the substrate 24 is conductive and an insulating layer or dielectric surrounds the substrate in order that a well electrode 26, via 22 and pad 100 can be configured on the substrate. The grid 102 can be connected to a conductive coating surrounding or covering a portion of the substrate or the body of the component 8. In this way, charge passed to the grid is conducted and dissipated in to the dielectric between the grid and conductive surfaces formed on the dielectric, which can create a common field that affects both common and well electrodes.

The grid can also be connected to the ground plane of the component, and the device, once the component is installed in the device 6. In other words, if the substrate is conductive and coated in a dielectric or insulator, the grid can dissipate charge into this capacitance, whose field affects both common and well electrodes.

The dimension of the pads and the surrounding grid is such that either (i) objects, such as a finger, are inhibited from contacting the array 16 because the grid functions as a barrier or (ii) if the array 16 is contacted by an object it first contacts the grid. Therefore, any charge accumulated on a user's hand, or tool they are holding, is inhibited from passing through the well 28 or well electrode 26 region if it approaches or contacts the component 8 in the region of the array of electrodes 16 because it is directed through or via the grid 102 to the common electrode 36.

Because the grid 102 and polar medium 32 are electrically connected, energy transferred from an ESD to the grid and to the polar medium requires negligible work done such that the voltage across a well 28 is negligible. In use, the layer of polar medium 32, which can contain a sample to be analysed, is electrically connected to the common electrode 36 via the conductive diffusion layer 40. The grid 102, common pad 104, common electrode 36, conductive diffusion layer 40 and polar medium 32 or sample have, therefore, negligible difference in potential between them if an ESD was applied to the grid. This is because the charge is distributed across these components, which inhibits any charge passing between an electrode pad 100 and the well 28 to the sample of polar solution when the grid is contacted or both the grid and a pad are contacted. Sensors and/or membranes formed or forming part of the well 28 are protected from an ESD to the array 16. The grid 102 acts as a shield—mechanically and/or electrically—that is connectable to a substantially large volume of fluid i.e. the polar medium 32. These elements of the component 8 are significantly larger, by at least 2 orders of magnitude, than the size of the wells 28 or the volume of fluid held in the wells. As described above, the ratio of the volume of fluid in a well 28 to the volume of the fluid in the layer above that forms the polar medium 32 can be between about 1:100 about 1:10000. In the example, the common cell chamber, or sample chamber for holding a polar medium 32 and associated common mediator chamber, has a volume of about 135 ul. In the example, which has an array of 130 electrodes, 126 are occupied by fluid for forming a membrane between each well and the sample chamber above and the total volume of fluid in the wells is about 0.9 ul. The ratio in the example is about 1:150. In this way, the grid and/or the volume of polar medium (which is significantly larger than all of the wells together) function as a buffer or insulator protecting the sensing elements of the wells and sensor elements therein from an ESD or similar uncontrolled charge. In other words, any uncontrolled charge or ESD is inhibited from conducting from a pad 100 to a well 28 because the grid 102 inhibits contact with the pad and/or inhibits contact with the pad without also contacting the grid such that either (i) a charge, such as an ESD, passes to the polar medium or sample to distribute the charge with such low energy consumption that there is negligible potential difference between the pads 100 and the well 28 or (ii) if the array 16 is contacted an ESD charge is inhibited from flowing across the well 28 because the grid 102 has been contacted such that the well 28 region and the grid have the same potential difference—the charge is already balanced.

In use, the component is packaged in material that inhibits the build up of charge to minimise the risk of damage to a sensor or membrane within a well 28, which can occur if a pad 100 of the array of electrodes 16 is touched. In field use, outside of a controlled environment such as a laboratory, there are rarely facilities such as earth-points or earth straps to divert uncontrolled voltages or ESD away from the pads.

To illustrate the dimensions of the invention, by way of an example illustration, the tip of a finger 106 is shown adjacent the grid 102 in FIG. 11. Should an object, such as a finger of a user, approach a pad 100 then contact with the pad is inhibited and, even if contacted, the finger would touch the grid before, during and after contact was made with the pad 100.

After initial manufacture of the component 8 and before population with a conductive fluid, such as a polar medium 32, the grid 102 is configured to protect any sensor that will subsequently be formed in the well 28.

Figure 12:
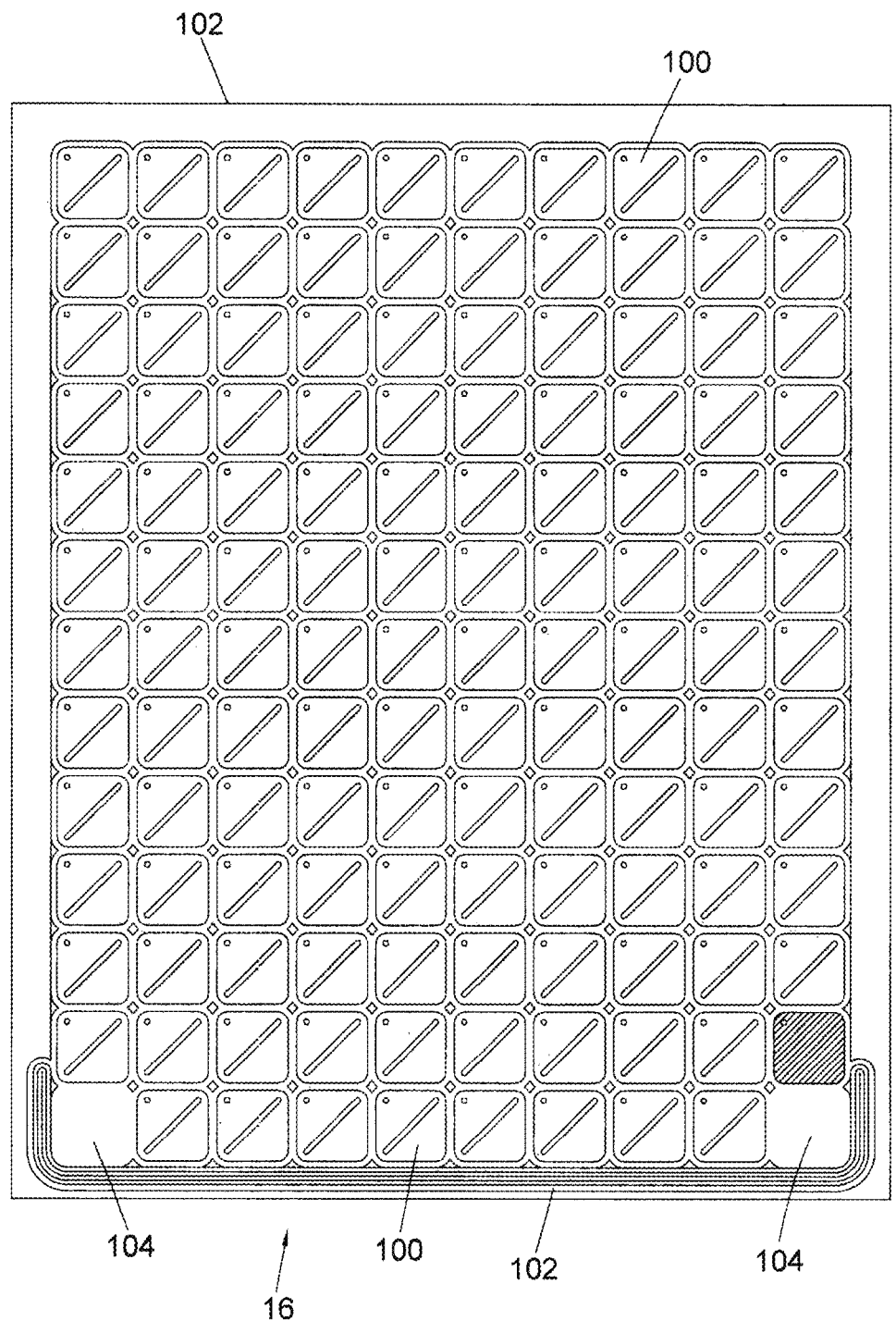
FIG. 12 is detailed view of an embodiment of the invention in which a grid is positioned across an array of electrodes and connected to a grounding electrode.
Figure 13:
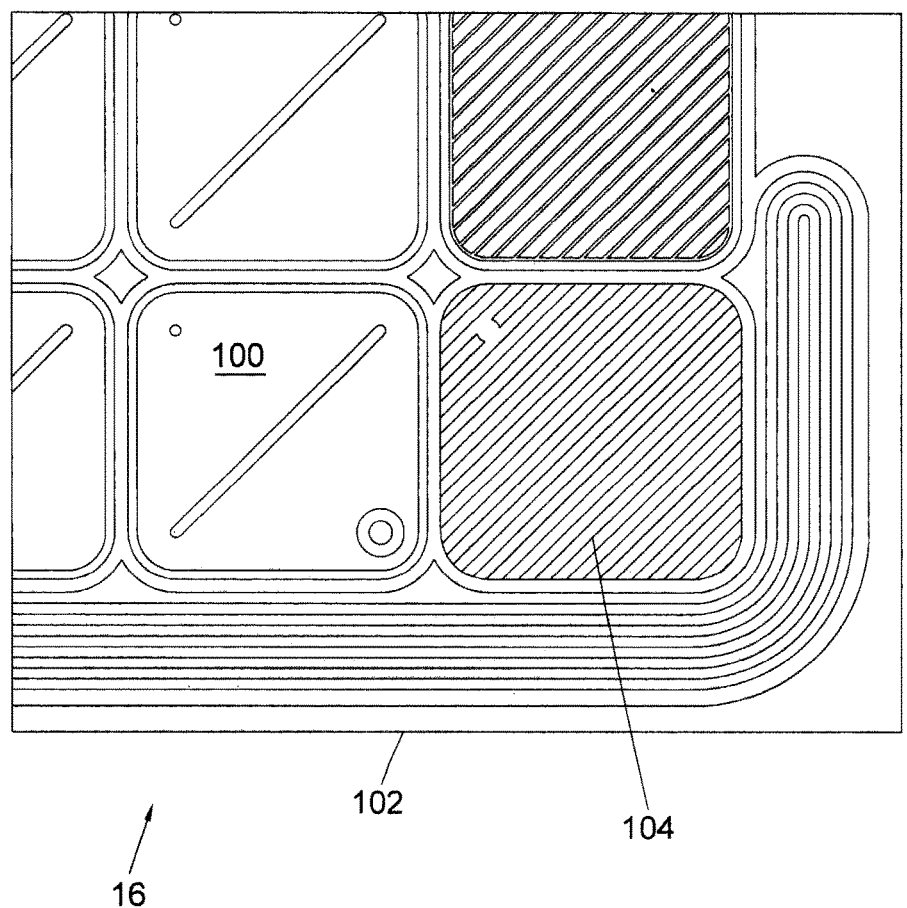
FIG. 13 is a detailed view of one corner of the embodiment shown in FIG. 12.

FIGS. 12 and 13 are snapshots of CAD images of embodiments of the grid 102 positioned between the pads 100 and connected to the common pad 104. The size of the array 16 is approximately 130 pads, equivalent to an array of about 13 pads by about 10 pads. The pitch between the pads is shown, by way of example, as 800 um. The pad is approximately square with sides about 710 um in length. The gap between the pad 100 and the grid is about 30 um. The thickness of the grid wall is approximately 30 um. The ratio of the thickness of the grid wall to the width of a pad is about 1:25. The ratio can be between about 1:10 and about 1:100. The distance between the walls of the grid, or sides of the opening can be sized to inhibit a finger time from being able to contact a pad without contacting the grid. By way of a guide, the maximum opening size can be about 2 mm from corner to corner of the pad.

FIG. 13 is a magnified view of the lower right-hand side of the array 16 in FIG. 12. It is to be noted that the shape of the grid 102 in the region surrounding an individual pad corresponds or matches the shape of the pad. The shape of the grid in the area adjacent a corner of a pad is curved. The shape of the grid is configured to minimise the inductance between the common pad 104 and any point on the grid 102.

A gap is provided between the pad 100 and the grid 102. The grid has been illustrated in other Figures as an extension of the substrate, preferably grown from the substrate, upon which the pad 100 is formed, which cannot be appreciated from the plan view of FIGS. 12 and 13. The upper-most surface of the grid has a conductive surface that is connected to the common pad 104.

Alternatively, the grid can lie flush with the surface of the array such that finger-contact with a pad is not inhibited but finger-contact with a pad 100 without touching the grid is inhibited.

The array 16 can additionally be covered by a protective antistatic tape (not shown) that can be removed from the array 16 on the component 8 prior to insertion and connection with the receiver 6. Without the grid 102 such tape could generate a triboelectric charge when peeled from the array 16 and damage the sensing function in a well 28. The tape, however, complements the function of the grid 102 because any triboelectric charge generated from its removal will not influence the sensing in the well because the tape is connected to the grid. The conductive structure is therefore covered, at least in part, with a removable protective conductive film or protective layer.

Figure 14:
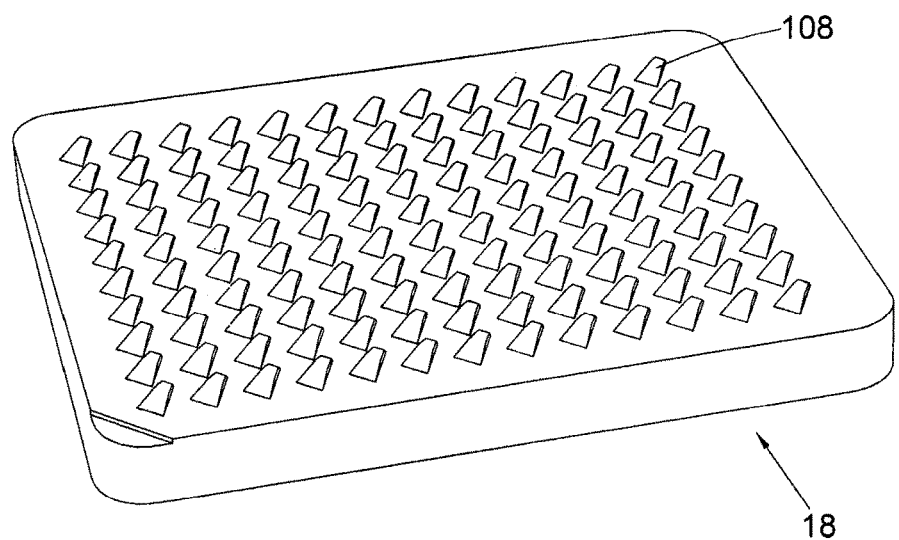
FIG. 14 is a perspective view of an array of connectors configured to extend between the grid to contact the array of electrodes of a component.
Figure 15:
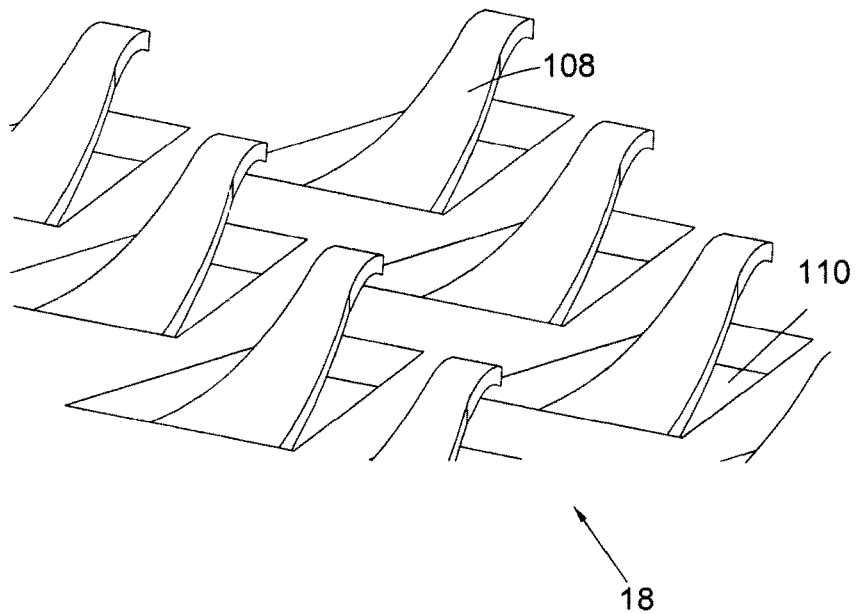
FIG. 15 is a perspective view of individual contacts of the connectors shown in FIG. 14.

Mechanical connections, such as spring-leaf metal contacts located on the receiver 6 for engagement with the electrodes on the component 8 can be provided. FIGS. 14 and 15 illustrates an example of the first array of connectors 108 with a pitch of 800 um. FIG. 15 shows a close-up of the connectors 108 which are sprung loaded and provided in respective recesses 110. To increase their strength each connector tapers outwards towards its base. The connectors are 100 um thick and project to height of 800 um above the recess. The connectors are advantageously sprung loaded and project from the base to facilitate their connection to the array of electrodes 16 under an applied force.

Figure 16:
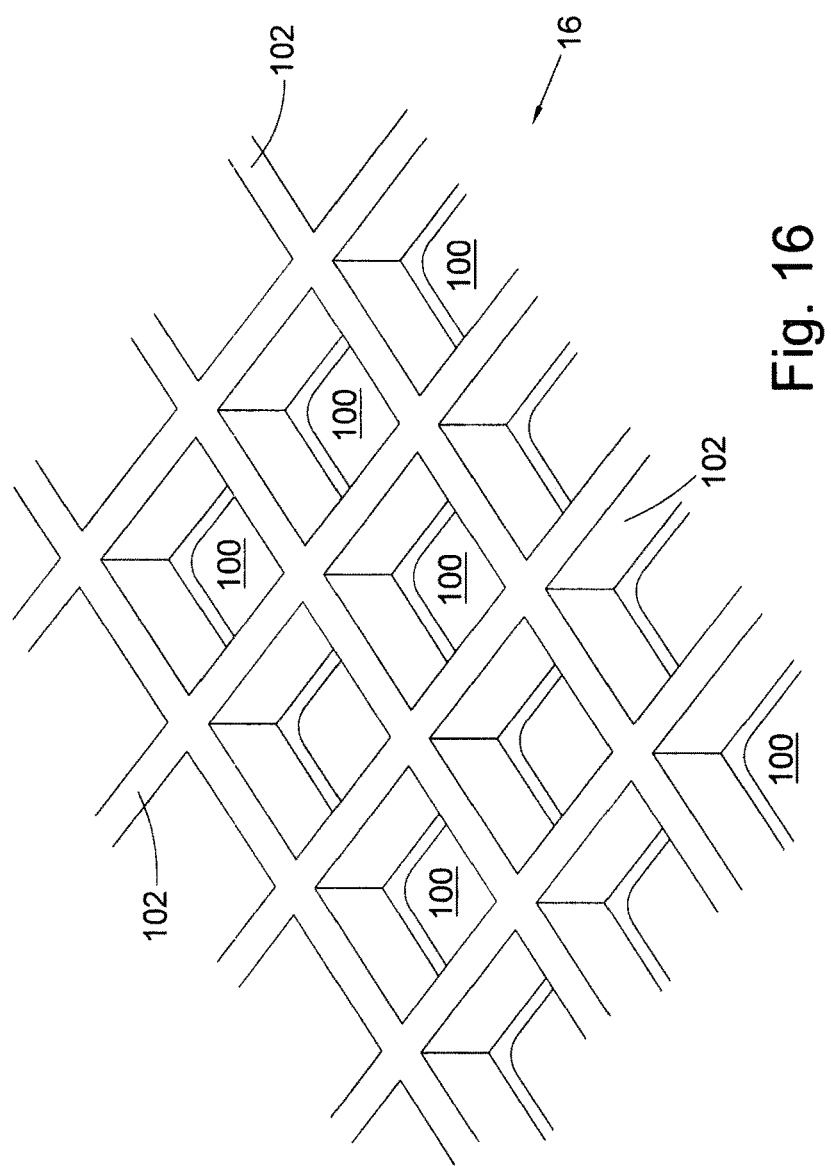
FIG. 16 is a perspective view of a section of the grid located upon a section of the array of electrodes.

FIG. 16 shows a perspective sketch view of a portion of a section of the grid 102. While FIG. 10 shows a cross-section indicating that the grid 102 is like a net resting upon legs or walls that extend from the substrate, FIG. 16 shows that the grid can have walls surrounding pads 100 of the electrodes. The examples shown herein have the grid surrounding every pad 100 on an array 16 but the grid can, alternatively surround groups of pads. Therefore, the grid can extend from areas on the substrate between the pads, but without contacting the pads 100, and form a wall. The top of the wall can be coated with a conductive material, such as gold or platinum to conduct ESD away from the pads. Alternatively the grid can have a non-raised profile and be approximately in the plane of the electrode array.

The height of a grid above the substrate-whether in net form, or whether in the form of walls as shown in FIG. 16, is determined by the height of the connectors 108. In FIGS. 14 and 15 the height of the contacts is about 800 um and would typically be reduced when compressed against a pad when the component 8 and device 6 were mated. For example, after mating the height could be reduced by compression by 25% to about 600 um. The height of the grid above the surface, therefore, can be around 500 um such that the grid was inhibited from contacting the array of connectors 18 on the device. During mating, the connectors 108 extend through the grid and between the net or between the walls to contact the pads 100. The gap between the pad 100 and the walls of the grid 102 insulate the array of electrodes from the grid 102.

As described above, the shape and formation of the grid is such that the inductance between the grid 102, common pad 104 and common electrode 32 is minimised.

The array of electrodes 16 and/or grid 102 have been described as formed on a substrate 24 with conductive surfaces for the pads 100 and for connection to, for example, the common electrode 36.

Figure 17A:
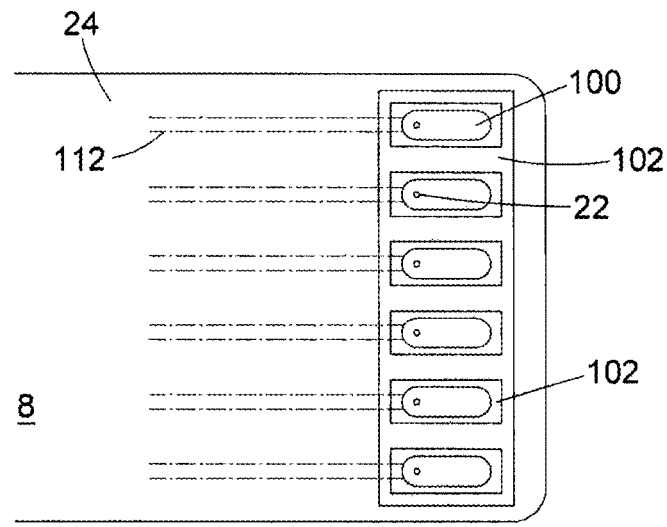
FIGS. 17a and 17b show two examples, respectively, of portions of alternative arrangements.
Figure 17B:
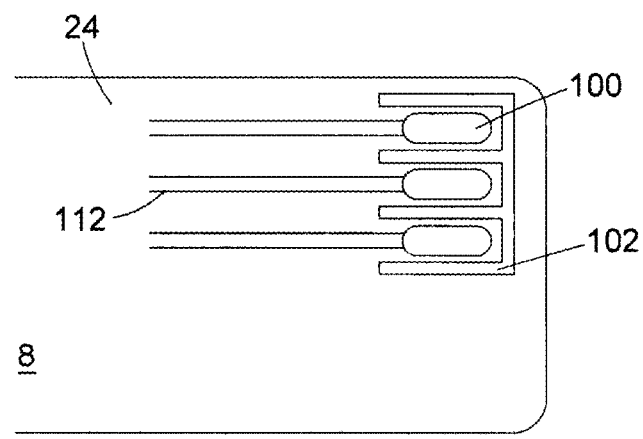

The purpose of the component is to provide a low cost single use device and in light of the teaching herein various low-cost manufacturing techniques are applicable to the examples. FIGS. 17*a* and 17*b* show two examples, respectively, of an array of electrodes 16 for connection to a device 6 having a multiple layer and single layer substrate. In the example shown in FIG. 13 the density of wells and electrodes is high, and has been fabricated on a substrate having coatings for electrodes and vias etc.

Alternatively, the pads 100 and grid 102 or tracks can be formed on, or by using:

silicon wafer fabrication, which can provide a grid minimum width as small as 5 um, with a gap between the pad and grid of 5 um;

glass wafer fabrication, which can provide a grid minimum width as small as 10 um, with a gap between the pad and grid of 10 um;

printed circuit boards, which can provide a grid minimum width as small as 50 um, with a gap between the pad and grid of 50 um;

high resolution printed circuit boards, which can provide a grid minimum width as small as 3 um, with a gap between the pad and grid of 5 um;

conductive ink, inkjet printed on card or polymers, which can provide a grid minimum width as small as 150 um, with a gap between the pad and grid of 50 um;

screen printing conductive ink on card or polymers, which can provide a grid minimum width as small as 20 um, with a gap between the pad and grid of 20 um; and sputtering conductive material on card or polymers, which can provide a grid minimum width as small as 10 um, with a gap between the pad and grid of 10 um.

By way of example, an inkjet printed, roll-coated digital microfluidic device for inexpensive, miniaturized diagnostic assays is known from a paper in the name of Dixon et al [Lab Chip, 2016, 16, 4560].

In FIG. 17*a*, an array of electrodes 16 are arranged at the side of a component. In this example the component is formed on a multi-layer printed circuit board. The pads are printed on an exposed layer and surrounded by a grid 102 that can be connected to a common electrode (not shown in this Figure). Tracks 112 are shown as dashed lines because they are provided on another layer and lead from vias 22, connected to the pads 100, to wells 28 located on the other side of the PCB. Reducing the number of wells 28 can reduce the complexity of the structure required to package said wells and simplify the circuits required to connect the wells to a device 6 via the array 16.

FIG. 17b shows a further simplified arrangement in which connections to pads 100 are arranged on single layer of substrate. The grid 102 continues to substantially surround the pads to inhibit damage caused by an ESD. In this particular configuration the single layer substrate and printed tracks enables the component to be formed on a device.

Like numerals in the Figures represent like features. The present invention has been described above purely by way of example, and modifications can be made within the spirit and scope of the invention, which extends to equivalents of the features described and combinations of one or more features described herein. The invention also consists in any individual features described or implicit herein.

LIST OF FEATURES

2 Apparatus
4 Device
6 Receiver
8 Component
10 Base
12 Latch
14 Recess
16 Array of electrodes
18 Array of connectors
20 Solder bump
22 Via
24 Substrate
26 Well electrode
28 Well/Recess
30 Seat
32 Layer of polar medium
34 Meniscus/membrane
34a Membrane
36 Common electrode
40 Conductive diffusion layer
100 Pad
102 Grid/conductive structure
104 Common pad
106 Finger tip
108 Connectors
110 Recess
112 Track

The invention claimed is:

1. A component configured to removably engage with a receiver, the component having:
 a substrate comprising a plurality of wells;
 a plurality of well electrodes, each one in a respective well of the plurality of wells;
 a common electrode outside of the wells and common to each well of the plurality of wells,
 wherein each well is configured to support a sensor including a membrane, wherein a membrane is formable across each well to separate fluid in the wells from a fluid outside of the wells, wherein the common electrode is configured to make electrical contact with a polar medium provided in each well of the plurality of wells; and
 an array of pads comprising an electrically conductive material and configured to removably connect with a corresponding array of connectors on the receiver;
 wherein each of the electrically conductive pads of the array is electrically connected via a respective via that passes through the substrate to a respective well electrode,
 wherein the component further comprises a conductive structure configured across the array of electrically conductive pads, wherein the conductive structure is configured as a grid and extends in a planar direction, defined by the substrate, between the electrically conductive pads of the array, such that an electrical connection can be made between the array of electrically conductive pads and the array of connectors on the receiver, and to inhibit an electrostatic discharge conducting across the wells and/or direct an electrostatic discharge away from the wells through the conductive structure, wherein the conductive structure includes a common pad that is connected to the common electrode.

2. The component according to claim 1, wherein the conductive structure includes a common pad that is electrically connected to the common electrode.

3. The component according to claim 1, wherein the array of electrically conductive pads is arranged on the substrate and the conductive structure is mounted on the substrate.

4. The component according to claim 3, wherein the conductive structure extends from a plane defined by the array of electrically conductive pads.

5. The component according to claim 3, wherein at least part of the substrate extends from a region between the electrically conductive pads to form a wall and the conductive structure is configured on top of the wall.

6. The component according to claim 3, wherein the conductive structure is formed from the deposition of a conductive material in a region between the electrically conductive pads of the array.

7. The component according to claim 1, wherein the plurality of well electrodes is arranged in an array having a rectilinear pattern.

8. The component according to claim 1, wherein the footprint of each electrode is quadrilateral.

9. The component according to claim 1, wherein a pitch of the electrically conductive pads of the array is between 100 microns and 1500 microns.

10. The component according to claim 1, wherein the thickness of the walls of the conductive structure, in cross-section, is between 20 microns and 200 microns.

11. The component according to claim 1, wherein apertures of the conductive structure through which the connectors extend have rounded corners.

12. The component according to claim 1, wherein the electrically conductive pad array and the conductive structure are covered, at least in part, with a removable protective film or protective layer.

13. A kit having the component according to claim 3 and the receiver, wherein each connector of the array of connectors on the receiver is configured to extend through the conductive structure without contacting the conductive structure to form an electrical connection with the corresponding electrically conductive pad of the array on the component.

14. The kit according to claim 13, wherein the conductive structure is connected to a conductive fluid above the wells to inhibit a potential difference occurring across the wells or membrane formed between the conductive fluid above the wells and the first fluid in the wells, such that when the conductive fluid is above the wells an electrostatic discharge is inhibited from conducting through the wells by the conductive structure.

* * * * *